United States Patent
Backes et al.

(12) 
(10) Patent No.: US 12,392,416 B2
(45) Date of Patent: *Aug. 19, 2025

(54) PEDAL MODULATING VALVE ASSEMBLY INCLUDING MULTIPLE GAIN STATES

(71) Applicant: ZF OFF-HIGHWAY SOLUTIONS MINNESOTA INC., North Mankato, MN (US)

(72) Inventors: Peter Backes, North Mankato, MN (US); Craig Lapoint, North Mankato, MN (US)

(73) Assignee: ZF OFF-HIGHWAY SOLUTIONS MINNESOTA INC., North Mankato, MN (US)

( * ) Notice: Subject to any disclaimer, the term of this patent is extended or adjusted under 35 U.S.C. 154(b) by 1303 days.

This patent is subject to a terminal disclaimer.

(21) Appl. No.: 17/104,373

(22) Filed: Nov. 25, 2020

(65) Prior Publication Data

US 2021/0164585 A1    Jun. 3, 2021

Related U.S. Application Data

(60) Provisional application No. 62/942,052, filed on Nov. 29, 2019.

(51) Int. Cl.
| | | |
|---|---|---|
| *B60T 13/14* | (2006.01) | |
| *F15B 13/02* | (2006.01) | |
| *F16K 11/07* | (2006.01) | |
| *F16K 31/62* | (2006.01) | |

(52) U.S. Cl.
CPC ........ *F16K 11/0716* (2013.01); *B60T 13/141* (2013.01); *F15B 13/024* (2013.01); *F16K 31/62* (2013.01); *Y10T 137/8671* (2015.04)

(58) Field of Classification Search
CPC .... B60T 13/141; B60T 13/147; B60T 13/148; B60T 15/043; F15B 13/024; F15B 13/025; F15B 13/043; F15B 20/007; F15B 2211/50518; F15B 2211/50527; F15B 2211/55; F16K 11/07; F16K 11/0708;

(Continued)

(56) References Cited

U.S. PATENT DOCUMENTS 3,606,820 A * 9/1971 Thomas ................. F15B 11/02
                                                91/526
3,738,379 A * 6/1973 Wilke ..................... F15B 11/15
                                                91/356

(Continued)

*Primary Examiner* — Kenneth Rinehart
*Assistant Examiner* — Jonathan J. Waddy
(74) *Attorney, Agent, or Firm* — WARNER NORCROSS + JUDD LLP

(57) ABSTRACT

A valve assembly is provided. The valve assembly includes a valve body defining a bore. The valve assembly further includes a plunger adjacent the valve body. The valve assembly further includes a modulating biasing member abutting the plunger. The valve assembly further includes a spool disposed in the bore and adjacent the plunger with the modulating biasing member disposed therebetween. The plunger is configured to move the spool between a neutral position and an energized position. The spool defines a socket. The valve assembly further includes a piston disposed in the socket and configured to move between a first piston position and a second piston position within the socket.

18 Claims, 5 Drawing Sheets

(58) Field of Classification Search
CPC .. F16K 11/0712; F16K 11/0716; F16K 31/62; Y10T 137/8671
USPC ........ 303/117.1; 137/625.25, 625.67, 625.69
See application file for complete search history.

(56) References Cited

U.S. PATENT DOCUMENTS

| | | | | |
|---|---|---|---|---|
| 3,807,449 | A * | 4/1974 | Van Dest | F15B 11/16 251/35 |
| 4,076,329 | A * | 2/1978 | Johnson | B60T 13/141 303/56 |
| 6,135,580 | A * | 10/2000 | Denning | B60T 13/141 303/117.1 |
| 6,217,128 | B1 * | 4/2001 | Tillman, Jr. | B60T 11/21 303/9.61 |
| 2003/0070715 | A1 * | 4/2003 | Royle | F16K 31/0613 137/625.65 |
| 2008/0087345 | A1 * | 4/2008 | Tabor | F16K 11/0716 137/625.65 |
| 2012/0112111 | A1 * | 5/2012 | Schmid | F16K 31/0613 251/318 |
| 2019/0178406 | A1 * | 6/2019 | Ishihara | F16H 61/02 |
| 2020/0041022 | A1 * | 2/2020 | Braun | F16K 31/0696 |
| 2021/0164585 | A1 * | 6/2021 | Backes | B60T 15/043 |
| 2021/0165431 | A1 * | 6/2021 | Backes | B60T 11/18 |
| 2022/0219652 | A1 * | 7/2022 | Tomhave | B60T 7/042 |
| 2023/0034880 | A1 * | 2/2023 | Backes | F16K 11/0708 |
| 2023/0311834 | A1 * | 10/2023 | Backes | F16K 27/048 251/129.15 |

* cited by examiner

PEDAL MODULATING VALVE ASSEMBLY INCLUDING MULTIPLE GAIN STATES

CROSS-REFERENCE TO RELATED APPLICATION

This application claims priority to and all advantages of U.S. Application No. 62/942,052, filed on Nov. 29, 2019, the contents of which are incorporated herein by reference.

TECHNICAL FIELD

The present disclosure generally relates to a pedal modulating valve assembly including a first gain state and a second gain state, and systems including the same, for working units and other applications.

BACKGROUND

Due to the increasing weights of vehicles, such as off highway vehicles, the brake energy required to stop these vehicles has also increased. To account for these increases, modern off highway vehicles include large and robust wheel brakes designed to be prepared for worst case conditions including an ability to apply the maximum brake pressure needed to bring the vehicle to the shortest possible stop in an emergency situation. While these wheel brakes are effective in worst case conditions, high fidelity control of the wheel brakes during lower pressure braking scenarios is difficult.

A wide variety of electrohydraulic proportional pressure control valves are used to provide controlled pressure to working units, such as wheel brakes. Some typical valves are designed for use with an actuator, such as a pedal actuator, in which force is applied to by a user. These pressure control valves provide a linear output characteristic for pressure versus force applied by the user to the actuator.

While this linear output characteristic permits braking at both the lower percentage of the brake pressure range and the higher percentage of the braking pressure range, a majority of the braking occurs in the lower percentage of the braking pressure range. Thus, a majority of the braking occurs without high fidelity control of the wheel brakes thereby resulting in abrupt or aggressive braking of the vehicle which affects control of the vehicle and operator comfort.

Accordingly, it is desirable to provide an improved valve assembly and a system including the same. Furthermore, other desirable features and characteristics will become apparent from the subsequent summary and detailed description and the appended claims, taken in conjunction with the foregoing technical field and background.

BRIEF SUMMARY

In one embodiment, a valve assembly is provided. The valve assembly includes a valve body defining a bore. The valve assembly further includes a plunger adjacent the valve body. The valve assembly further includes a modulating biasing member disposed in the bore and abutting the plunger. The valve assembly further includes a spool disposed in the bore and adjacent the plunger with the modulating biasing member disposed therebetween. The plunger is configured to move the spool between a neutral position and an energized position. The spool defines a socket. The valve assembly further includes a piston disposed in the socket and configured to move between a first piston position and a second piston position within the socket.

In this and other embodiments, by moving the piston from the first piston position to the second piston position, fluid within the socket is limited to a predefined force and therefore no longer acts to further oppose movement of the spool by the plunger. As a result, force required to move the spool toward the energized position by the plunger when the piston is in the second piston position is decreased relative to the force required when the piston is in the first piston position.

In this and other embodiments, the valve assembly has a first gain state and a second gain state. The valve assembly is in the first gain state when the piston is in the first piston position, and the valve assembly is in the second gain state when the piston is in the second piston position. The valve assembly having the first gain state and the second gain state provides the user improved fidelity at lower pressures while still allowing a working unit to reach higher pressures. For working units, such as wheel brakes of a vehicle, lower pressures are typically utilized during a majority of the braking of the vehicle. Thus, improving fidelity of the wheel brakes at lower pressures can improve overall usability of the vehicle. However, higher pressures may be necessary in emergency situations. Therefore, multiple gain states are important to allow the working unit to reach higher pressures while still exhibiting improved fidelity at lower pressures.

In another embodiment, a system having a first gain state and a second gain state is also provided. The system includes, but is not limited to, a fluid source configured to provide a fluid force (e.g., hydraulic fluid pressure). The system further includes, but is not limited to, a valve assembly in fluid communication with the fluid source. The valve assembly includes, but is not limited to, a plunger. The valve assembly further includes, but is not limited to, a modulating biasing member abutting the plunger. The valve assembly further includes, but is not limited to, a spool. The spool is adjacent the plunger with the modulating biasing member disposed therebetween. The plunger is configured to move the spool between a neutral position and an energized position. The valve assembly further includes, but is not limited to, a piston. The piston is in fluid communication with the fluid source. The piston is configured to move between a first piston position and a second piston position. The system further includes, but is not limited to, a working unit in fluid communication with the valve assembly and configured to activate in response to the fluid force. The system is in the first gain state when the piston is in the first piston position and the system is in the second gain state when the piston is in the second piston position.

BRIEF DESCRIPTION OF THE DRAWING(S)

Other advantages of the disclosed subject matter will be readily appreciated, as the same becomes better understood by reference to the following detailed description when considered in connection with the accompanying drawings wherein.

DETAILED DESCRIPTION

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

The following detailed description is merely exemplary in nature and is not intended to limit the invention or the application and uses of the invention. Furthermore, there is no intention to be bound by any theory presented in the preceding background or the following detailed description.

A valve assembly is provided herein. In various embodiments, the valve assembly is suitable for controlling a working unit of a vehicle. A system for controlling a working unit of a vehicle is also provided herein.

Figure 1A:
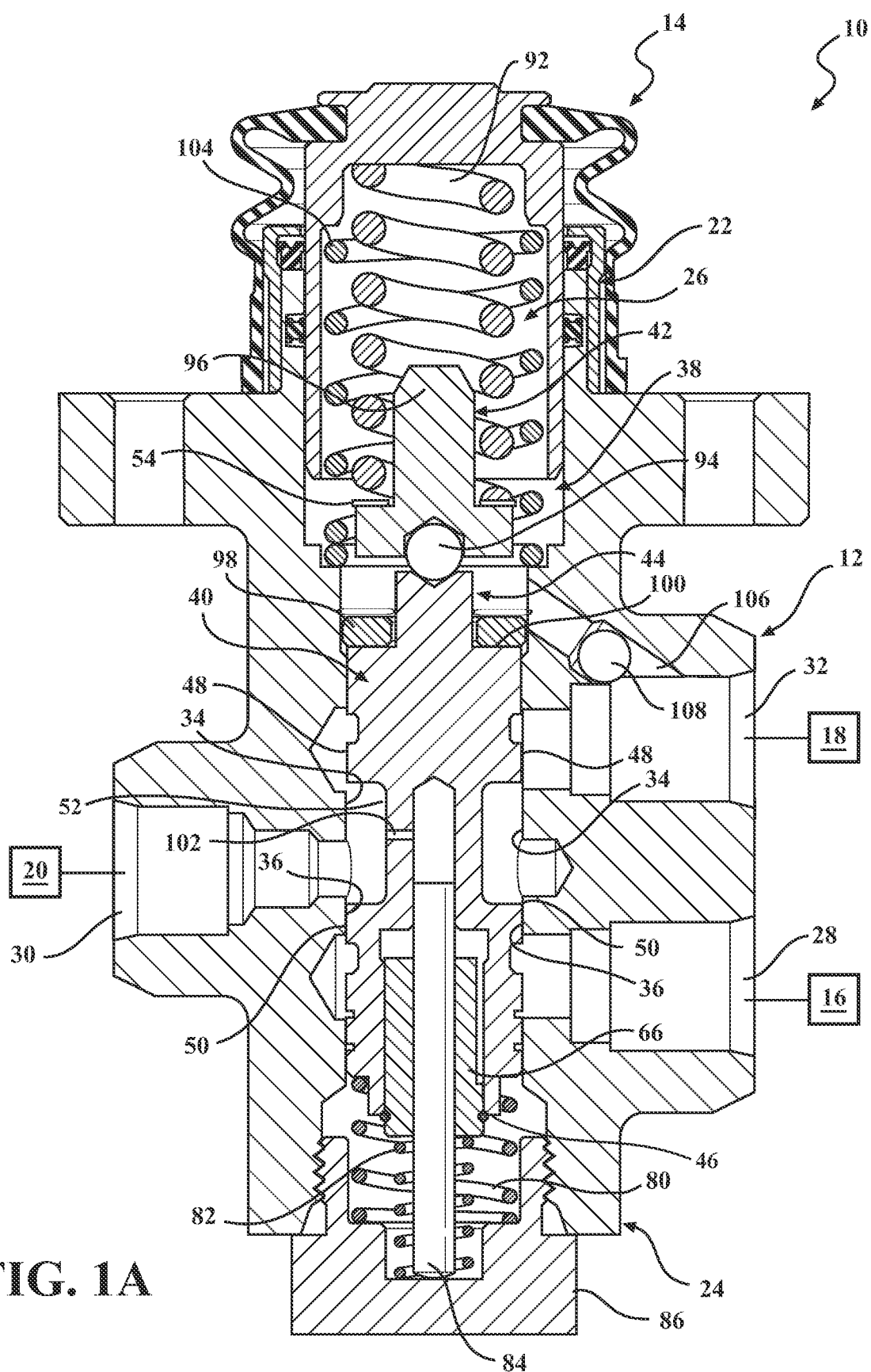
FIGS. 1A and 1B are a cross-sectional plan views illustrating a non-limiting embodiment of a valve assembly.
Figure 1B:
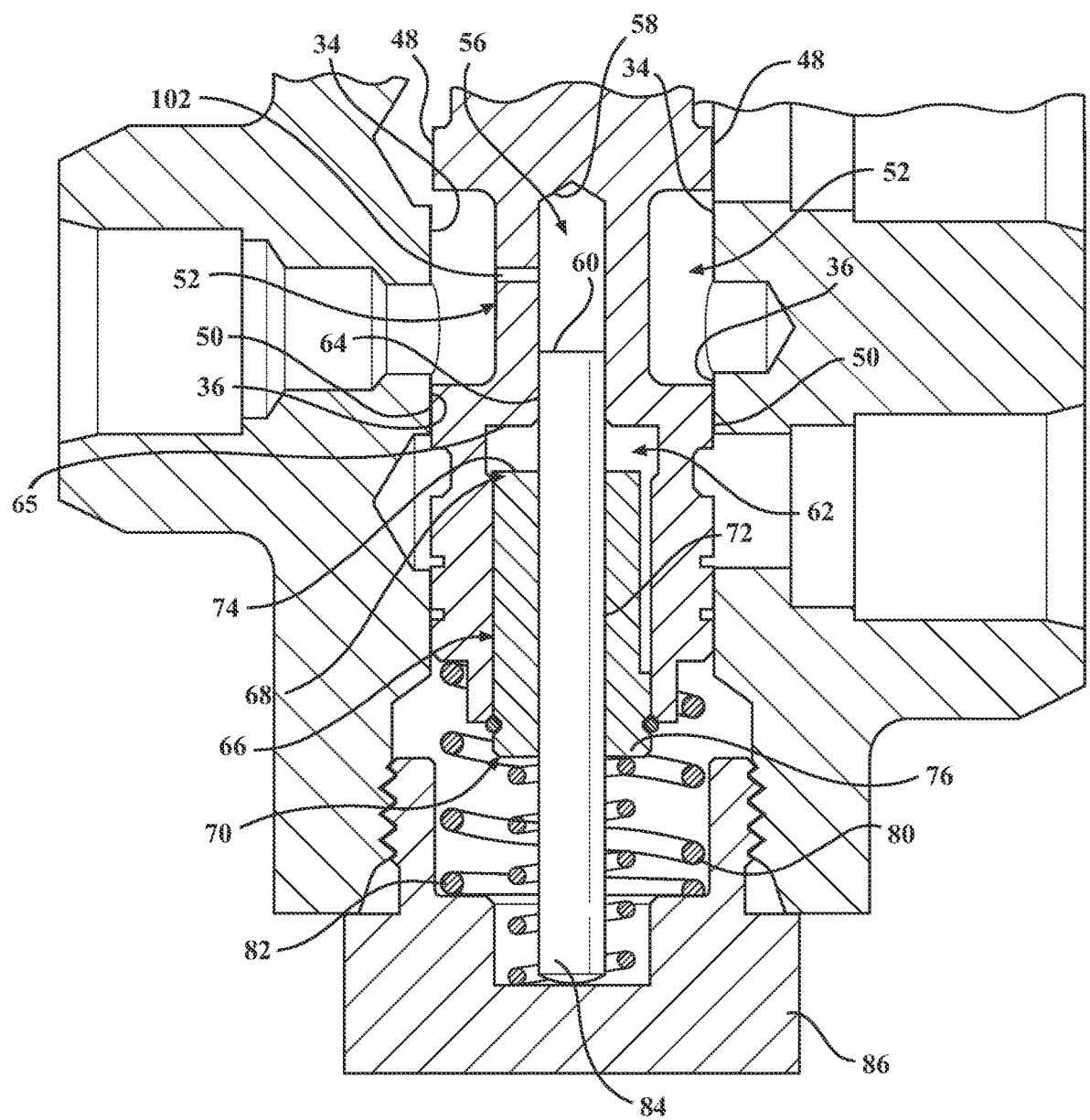
Figure 2:
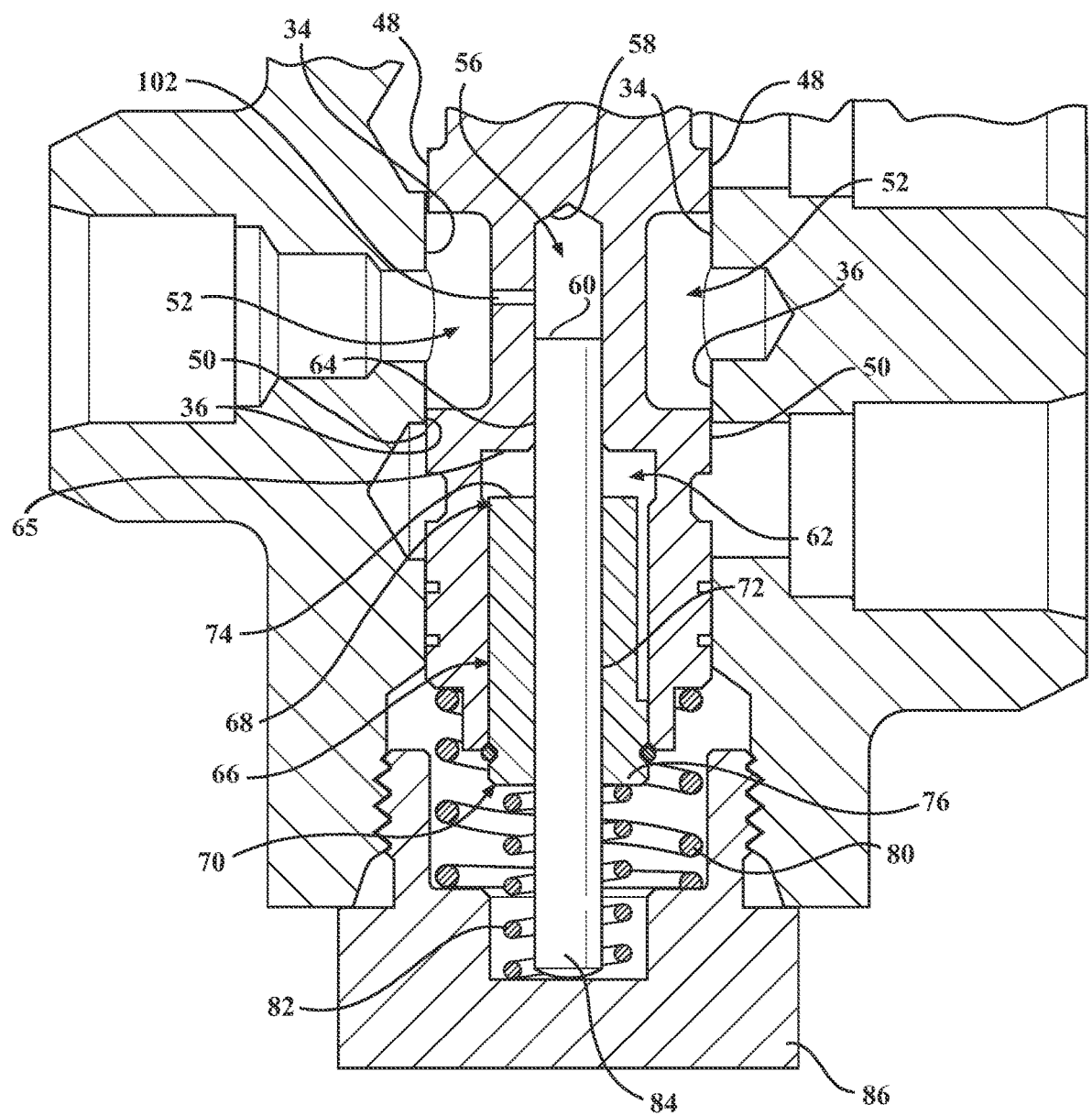
FIG. 2 is another cross-sectional plan view illustrating a non-limiting embodiment of the valve assembly.
Figure 3:
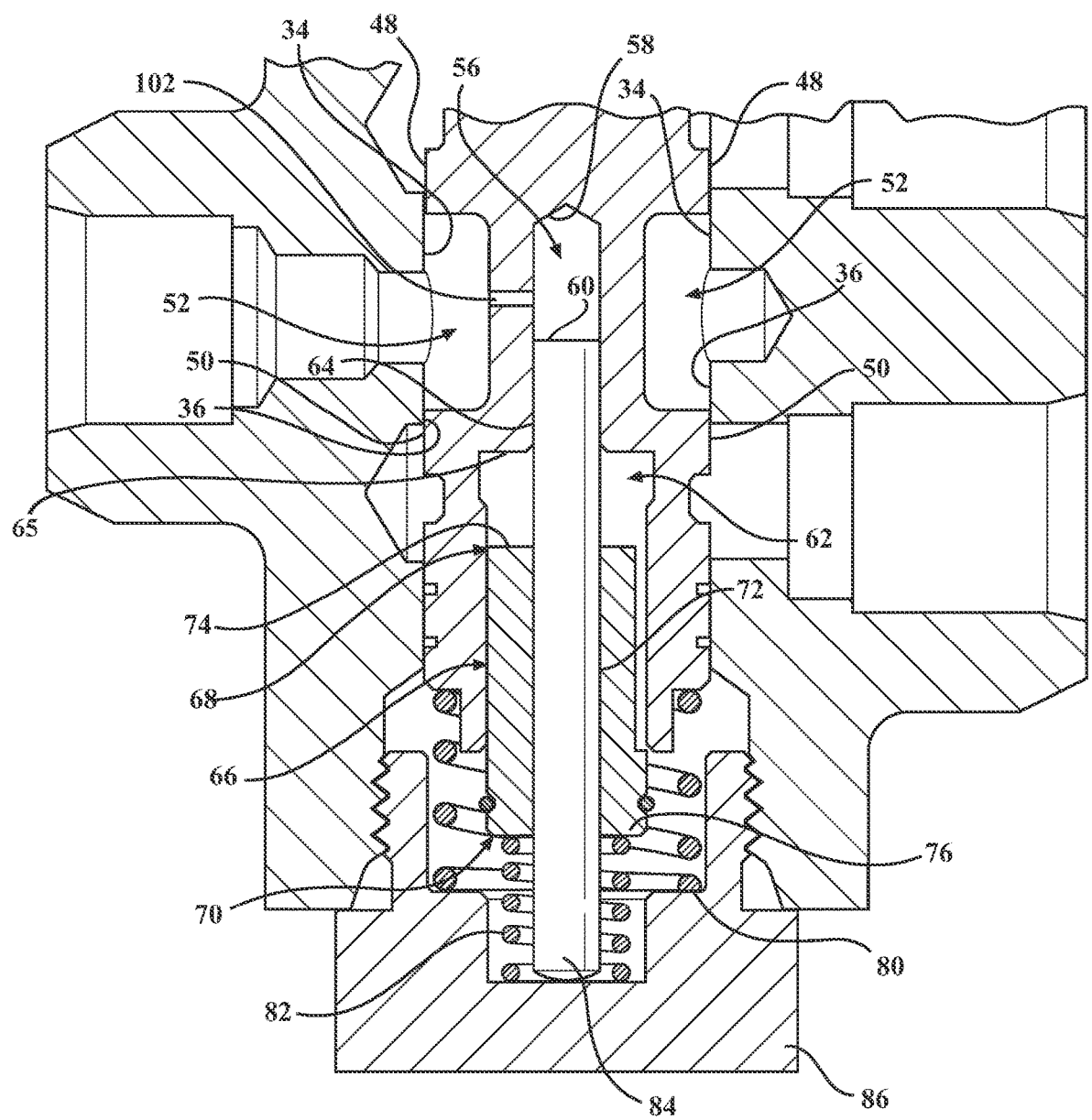
FIG. 3 is another cross-sectional plan view illustrating a non-limiting embodiment of the valve assembly.

FIGS. 1-3 are cross-sectional plan views illustrating a non-limiting embodiment of a valve assembly 10. The valve assembly 10 includes a valve body 12 and a plunger 14 adjacent the valve body 12. In certain embodiments, a user applies a force to the plunger 14 and the plunger 14 is configured to receive the force from the user. In various embodiments, the valve assembly 10 is utilized with a fluid source 16 (e.g., hydraulic pressure unit or hydraulic pump), a tank 18 (e.g., a hydraulic reservoir), and a working unit 20 (e.g., a hydraulic cylinder or wheel brake). In various embodiments, the fluid source 16 is configured to provide fluid force (e.g. hydraulic fluid pressure) to the valve assembly 10. For purposes of clarification, the valve body 12 will be described as having a first body end 22 and a second body end 24.

The valve body 12 of the valve assembly 10 defines a bore 26. The bore 26 may be manufactured as a through bore extending through the valve body 12. It is contemplated that the bore 26 may also be configured as a blind bore. The valve body 12 further defines a pressure port 28, a work port 30, and a tank port 32. The bore 26 typically extends through the valve body 12 between the first body end 22 and the second body end 24. Each of the ports 28, 30, and 32 may be in fluid communication with the bore 26. As shown in a non-limiting embodiment of FIG. 1, the pressure port 28 is disposed proximate the second body end 24 and the tank port 32 is disposed proximate the first body end 22. The work port 30 is disposed intermediate the pressure port 28 and the tank port 32. In certain embodiments, the ports 28, 30, and 32 provide connection locations for establishing fluid communication between the valve body 12 and the hydraulic pump 16, the working unit 20, and the tank 18. Typical port connections include standard SAE straight threads or other configurations for allowing hoses or other conduits to be connected between the components. However, it is to be appreciated that other port configurations are contemplated, for example, the pressure port 28 may be disposed proximate the first body end 22 and the tank port 32 may be disposed proximate the second body end 24.

The bore 26 may include a first annular surface 34 and a second annular surface 36. These surfaces 34, 36 may be utilized to provide fluid communication between the ports 28, 30, and 32. The bore 26 may also include a countersink region 38. In various embodiments, the countersink region 38 is proximate the first body end 22.

The valve assembly 10 further includes a spool 40 disposed in the bore 26. The spool 40 is adjacent and operatively coupled to the plunger 14. The plunger 14 is configured to move the spool 40 between a neutral position (see FIG. 1A) and an energized position (see FIG. 3). In various embodiments, the plunger 14 is configured to move the spool 40 to an intermediate position (see FIG. 2) between the neutral position and the energized position. In certain embodiments, the valve assembly 10 further includes a retaining member 42 operatively coupled to the spool 40 for moving the spool 40 between the neutral position and the energized position. The valve assembly 10 may further includes a ball bearing member 94 as a universal joint between the retaining member 42 and the spool 40. In various embodiments, the spool 40 includes a first spool end 44 and a second spool end 46 with the retaining member 42 operatively coupled to the first spool end 44.

In certain embodiments, the spool 40 includes a first annular portion 48 and a second annular portion 50. The first annular portion 48 and the second annular portion 50 may be configured to cooperate with the first annular surface 34 and the second annular surface 36 of the bore 26, respectively, for manipulating fluid communication between the ports 28, 30, and 32. The spool 40 may further includes a flow portion 52 having a decreased diameter relative to the first annular portion 48 and the second annular portion 50 for providing fluid communication to the work port 30. The spool 40 may also include a shoulder 100 proximate the first spool end 44 and configured to cooperate with the countersink region 38 of the valve body 12.

With reference to FIGS. 1A and 1B, when the spool 40 is in the neutral position, fluid communication may be provided between the work port 30 and the tank port 32. Further, when the spool 40 is in the neutral position, fluid communication may be prevented between the pressure port 28 and the work port 30. In particular, when the spool 40 is in the neutral position, the second annular portion 50 may be engaged with the second annular surface 36 thereby preventing fluid to flow between the pressure port 28 and the work port 30.

With reference to FIGS. 2 and 3, when the spool 40 is in the intermediate position or the energized position, respectively, fluid communication may be provided between the pressure port 28 and the work port 30. Further, when the spool 40 is in the intermediate position or the energized position, fluid communication may be prevented between the work port 30 and the tank port 32. In particular, when the spool 40 is in the intermediate position or the energized position, the first annular portion 48 may be engaged with the first annular surface 34 thereby preventing fluid to flow between the work port 30 and the tank port 32.

It is to be appreciated that the valve assembly 10 may operate in a different manner. For example, the energized position of a spool may provide fluid communication between a work port and a tank port and the neutral position of the spool may provide fluid communication between a pressure port and the work port.

With continuing reference to FIGS. 1-3, the spool 40 may define a cavity 56 between the first annular portion 48 and the second annular portion 50. In certain embodiments, the cavity 56 is in fluid communication with the work port 30 and the tank port 32 through an orifice 102 when the spool 40 is in the neutral position. Further, in these embodiments, the cavity 56 is in fluid communication with the pressure port 28 and the work port 30 through the orifice 102 when the spool 40 is in the energized position.

In certain embodiments, the spool 40 defines a socket 62 between the second spool end 46 and the cavity 56. The socket 62 may extend through the second spool end 46. The spool 40 may have a socket face 65 opposite the second spool end 46 and within the socket 62. The spool 40 may define a channel 64 extending between the socket 62 and the cavity 56 such that the socket 62 is in fluid communication with the cavity 56. In various embodiments, fluid provided between the work port 30 and the tank port 32 is also provided to the socket 62 through the orifice 102, then through the cavity 56, and then through the channel 64 when the spool 40 is in the neutral position. Likewise, fluid provided between the pressure port 28 and the work port 30 is also provided to the socket 62 through the orifice 102, then through the cavity 56, and then through the channel 64 when the spool 40 is in the energized position.

The valve assembly 10 further includes a piston 66 disposed in the socket 62. The piston 66 is configured to move between a first piston position (see FIGS. 1A and 2) and a second piston position (see FIG. 3) in response to the fluid. In certain embodiments, the first piston position and the second piston position are relative to the spool 40. The piston 66 includes a first piston end 68 and a second piston end 70 spaced from the first piston end 68 with a void 72 defined therebetween.

With continuing reference to FIGS. 1-3, the valve assembly 10 may further include a dowel 84 extending through the spool 40 and the piston 66. In various embodiments, the dowel 84 extends through the void 72 of the piston 66, the socket 62 of the spool 40, and the channel 64 of the spool 40. The valve assembly 10 may further include a plug 86 disposed proximate the second body end 24 of the valve body 12 within the bore 26. The dowel 84 may be adapted to abut the plug 86 to prevent the dowel 84 from moving beyond the plug 86 toward the second body end 24. The spool 40 may be operatively arranged with the dowel 84 so as to slide relative to the dowel 84. The piston 66 may also be operatively arranged with the dowel 84 so as to slide relative to the dowel 84.

The spool 40 may have a spool face 58 and the dowel 84 may have a dowel face 60 with the spool face 58 and the dowel face 60 flanking the cavity 56. As the spool 40 moves from the neutral position to the energized position, fluid provided between the pressure port 28 and the work port 30 acts on the spool face 58 and the dowel face 60. To this end, the spool face 58 and the dowel face 60 create an imbalanced pressure load on the spool 40 in the presence of the force of the fluid due to the dowel 84 being prevented from moving beyond the plug 86. In various embodiments, this imbalanced pressure load biases the spool 40 toward the first body end 22 (e.g., toward the neutral position) and the piston 66 may have a piston face 74 with the socket face 65 and piston face 74 flanking the socket 62. As the spool 40 moves from the neutral position to the energized position, fluid provided between the pressure port 28 and the work port 30 communicates through channel 64 of the piston 66. To this end, the socket face 65 and the position face 74 create an imbalanced force load on the spool 40 in the presence of the pressure of the fluid. The sum of the pressure force acting on the spool face 58 and the piston face 74 combine to react against the applied force at the plunger 14.

The second piston end 70 includes an extension 76 configured to cooperate with the second spool end 46 to prevent fluid communication between the socket 62 and pressure port 28 when the piston 66 is in the first piston position. As the spool 40 moves from the neutral position to the energized position, fluid provided between the pressure port 28 and the work port 30 through the channel 64 acts on the piston face 74 when the piston 66 is in the first piston position. When the piston 66 is in the second piston position, the piston 66 and the spool 40 cooperate to define a relief passage 78 to limit the force of the fluid acting on the piston face 74 and socket face 65 thereby preventing the piston 66 from absorbing additional force by the fluid. To this end, by moving the piston 66 from the first piston position to the second piston position, force acting on the piston face 74 and socket face 65 due to fluid within the socket 66 is limited to the pressure at which the relief passage 78 begins to meter flow out of socket 66 to oppose movement of the spool 40 by the plunger 14. As a result, the force required to move the spool 40 toward the energized position by the plunger 14 when the piston 66 is in the second piston position is decreased relative to the force required when the piston 66 is in the first piston position. In various embodiments, the relief passage 78 is in fluid communication with the pressure port 28 due to disengagement of the extension 76 from the second spool end 46. Thus, when the piston 66 is in the second position, the channel 64 is in fluid communication with the pressure port 28 through the passage 78 such that fluid pressure in channel 64 is limited to the pressure at which the passage 78 started fluid communication to the pressure port 28. As a result when the piston 66 is in the second position, fluid may flow from the channel 64, through the socket 62, around the piston 66, through the relief passage 78, and to the pressure port 28.

The valve assembly 10 may further include a first compensating biasing member 80 exhibiting a first force on the spool 40 to bias the spool 40 toward the first body end 22 (e.g., toward the neutral position). The valve assembly 10 may further include a second compensating biasing member 82 exhibiting a second force on the piston 66 to bias the piston 66 to the first piston position. In certain embodiments, the piston 66 is configured to move to the second piston position prior to the spool 40 moving to the energized position due to a ratio of the first force and the second force. The first compensating biasing member 80 and the second compensating biasing member 82 may, independently, include any standard spring commonly used and known by those having skill in the art or any other feed-back device such as pneumatic struts, electromagnets, or elastomeric force feed-back devices. Alternatively, the first compensating biasing member 80 and/or the second compensating biasing member 82 may be omitted in applications where the imbalanced work port pressure alone is used to return the spool to the neutral position and/or return the piston 66 to the first piston position.

Figure 4:
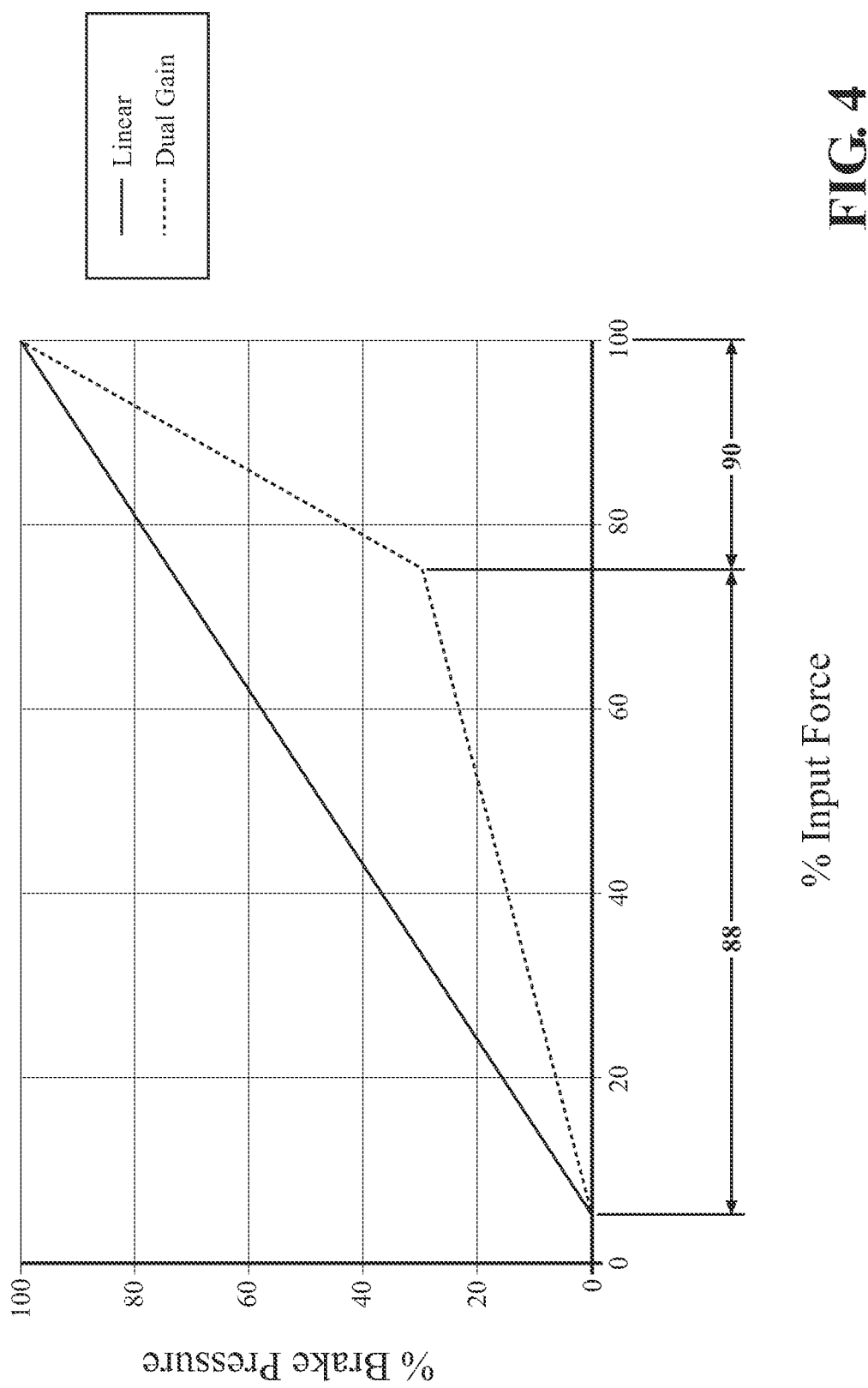
FIG. 4 is a graph illustrating gain states of a non-limiting embodiment of the valve assembly as compared to the prior art.

FIG. 4 is a graph illustrating gain states of a non-limiting embodiment of the valve assembly 10 as compared to the prior art. The valve assembly 10 has a first gain state 88 and a second gain state 90. The valve assembly 10 may be in the first gain state 88 when the piston 66 is in the first piston position. The valve assembly 10 may be in the second gain state 90 when the piston 66 is in the second piston position. It is to be appreciated that the valve assembly 10 may be configured to have more than two gain states. When the valve assembly 10 is in the first gain state 88, a greater amount of force by the plunger 14 on the spool 40 is necessary to move the spool 40 toward the second body end 24 as compared to when the valve assembly 10 is in the second gain state 90. When the valve assembly 10 is in the second gain state 90, a reduced amount of force by the plunger 14 on the spool 40 is necessary to move the spool 40 toward the second body end 24 as compared to when the valve assembly 10 is in the first gain state 88.

With continuing reference to FIG. 4, multiple gain states, such as the first gain state 88 and the second gain state 90 of the valve assembly 10 provide the user improved fidelity at lower pressures while still allowing the working unit 16 to reach higher pressures. For wheel brakes of a vehicle, lower pressures are typically utilized during a majority of the braking of the vehicle. Thus, improving fidelity of the wheel brakes at lower pressures can improve overall usability of the vehicle. However, higher pressures may be necessary in emergency situations. Therefore, multiple gain states are important to allow the working unit 16 to reach higher pressures while still exhibiting improved fidelity at lower pressures.

When the valve assembly 10 is in the first gain state 88, the force of the fluid from the work port 30 acts on the dowel 84 and the piston 66. This force biases the dowel 84 against the plug 86. However, this force on the piston 66 is not sufficient to overcome the second force of the second compensating biasing member 82 thereby maintaining the piston 66 in the first piston position. In various embodiments, the piston 66 is adapted to generate a force to oppose movement of the spool 40 by the plunger 14. In some of these embodiments, the force is in accordance with the second force of the second compensating biasing member 82. In certain embodiments, the force is equal to the second force of the second compensating biasing member 82. The pressure force acting on the spool face 58 and the socket face 65 may also act on the spool 40 in a similar amount. Pressure force acting on piston face 74 opposes force from the second compensating member 82. To this end, the combined pressure force on spool face 58 and the socket face 65, the first compensating biasing member 80, and the second compensating biasing member 82 via the piston 66, are biasing the spool 40 toward the first body end 22 (e.g., toward the neutral position), opposing the force generated by the plunger 14. Thus, when the valve assembly 10 is in the first gain state 88, a greater amount of force opposes movement of the spool 40 toward the second body end 24 thereby reducing the force of the fluid acting on the work port 30 relative to the amount of force generated by the plunger 14. With reference to FIG. 4, the first gain state 88 exhibits a lower slope for pressure at the work port 30 relative to the force applied by the user to the plunger 14 as compared to the second gain state 90.

When the valve assembly 10 is in the second gain state 90, the force of the fluid from the work port 30 continues to act on the spool face 58 and to a reduced amount to the piston face 74 and socket face 65. In contrast to the first gain state 88, where fluid from the work port 30 continues to act fully on spool face 58 and the socket face 65 this force on the piston 66 is sufficient to overcome the second force at a second pressure, piston 66 moves to the second piston position and defining the relief passage 78. With the relief passage 78 defined, via the piston 66 pressure in socket 62 is limited to a maximum pressure. Pressure force acting on the socket face 65 is limited to bias the spool 40 toward the first body end 22. A pre-defined force in accordance with the force of the biasing member 82 acts on piston 66. In other words, the force generated by the socket face 65 may be limited to a pre-defined force when the piston 66 is in the second piston position and the pre-defined force may be in accordance with the second force of the second compensating biasing member 82 when the piston 66 is in the second piston position. In certain embodiments, the pre-defined force is equal to the second force of the second compensating biasing member 82 when the piston 66 is in the second piston position. To this end, the force acting on spool face 58 and the limited force acting on the socket face 65, and the first compensating biasing member 80 are biasing the spool 40 toward the first body end 22 (e.g., toward the neutral position), opposing the force generated by the plunger 14. Thus, when the valve assembly 10 is in the second gain state 90 as opposed to the first gain state 88, a reduced amount of force opposes movement of the spool 40 toward the second body end 24 thereby increasing the force of the fluid acting on the work port 30 relative to the amount of force generated by the plunger 14. With reference to FIG. 4, the second gain state 90 exhibits a higher slope for pressure at the work port 30 relative to the force applied by the user to the plunger 14 as compared to the first gain state 88.

The valve assembly 10 may further include a modulating biasing member 92 disposed in the bore 26 and abutting the plunger 14. In certain embodiments, the modulating biasing member 92 is disposed between the plunger 14 and the retaining member 42 proximate the first body end 22. The modulating biasing member 92 may be positioned within the countersink region 38 of the bore 26. The modulating biasing member 92 may include a variety of compression spring configurations. Other spring types that may be used include bevel springs, torsion springs with levers, leaf springs, and the like.

The retaining member 42 may be configured with an interior shoulder 54. The modulating biasing member 92 may be positioned longitudinally between the plunger 14 and the interior shoulder 54 of the retaining member 42. The retaining member 42 may be configured to transfer force from the modulating biasing member 92 to the spool 40 when the modulating biasing member 92 is compressed by the plunger 14. In various embodiments, the retaining member 42 includes an extended portion 96 having an inside diameter adapted to guide the modulating biasing member 92. The extended portion 96 maintains the modulating biasing member 92 in a longitudinal orientation.

In various embodiments, a return spring 104 is disposed between the plunger 14 and the valve body 12. The plunger 14 may be configured to move into the bore 26 against the resistance of the return spring 104. When pressure is removed from the plunger 14, the return spring 104 is configured to return the plunger 14 to a normal position.

In certain embodiments, a washer 98 is disposed between the shoulder 100 of the spool 40 and the retaining member 42. The washer 98 may define the neutral position of the spool 40 by providing a mechanical stop to prevent movement of the spool 40 beyond neutral position toward the first body end 22. As shown in FIG. 1, the washer 98 contacts the countersink region 38 due to tension from the retaining member 42 acting on the washer 98. The washer 98 also contacts the shoulder 100 of the spool 40 when the spool 40 is in the neutral position due tension from the first compensating biasing member 80 acting on the spool 40. The tension from the first compensating biasing member 80 may also be lower than the tension provided by modulating biasing member 92 when the spool 40 is in the neutral position.

It is to be understood that spring compression may be adapted to various applications by modifying the length of the spring retaining member, the thickness of the washer, the stiffness of the spring, or other various structural features as would be obvious to one of ordinary skill in the art.

In various embodiments, a check valve passage 106 extends between the tank port 32 and the bore 26. A check valve 108 may be configured to control flow through the check valve passage 106 between the tank port 32 and the bore 26.

With reference back to FIGS. 1-3, non-limiting embodiments of operation of the valve assembly 10 are depicted therein. In certain embodiments, when fluid is desired to operate the working unit 20, the valve assembly 10 is energized. A user applies a force to the plunger 14 begins developing axial force from the neutral state shown in FIG. 1. The plunger 14 moves the spool 40 toward the second body end 24 to the first gain state 88 of the valve assembly 10 shown in FIG. 2. In the first gain state 88, fluid is permitted to flow from the pressure port 28 around the flow portion 52 having a decreased diameter and through cavity 56 of the spool 40, and to the work port 30 for operation of the working unit 20. At the same time, fluid flow to the tank port 32 is obstructed by cooperation between the first annular surface 34 of the valve body 12 and the first annular portion 48 of the spool 40. As described above, when the valve assembly 10 is in the first gain state 88, a greater amount of force opposes movement of the spool 40 toward the second body end 24 thereby reducing the force of the fluid acting on the work port 30 relative to the amount of force acting on the spool 40 by the plunger 14 due to the force acting on the spool 40 at the spool face 58 and the socket face 65. In other words, a greater amount of force acting on the spool 40 by the plunger 14 is necessary to move the spool 40 toward the second body end 24 as compared to when the valve assembly 10 is in the second gain state 90.

As the plunger 14 continues providing axial force during the first gain state 88 as shown in FIG. 2, the plunger 14 continues to move the spool 40 toward the second body end 24 to the second gain state 90 of the valve assembly 10 as shown in FIG. 3. In the second gain state 90, fluid is still permitted to flow from the pressure port 28 around the flow portion 52 having a decreased diameter and through cavity 56 of the spool 40, and to the work port 30 for operation of the working unit 20. At the same time, fluid flow to the tank port 32 is still obstructed by cooperation between the first annular surface 34 of the valve body 12 and the first annular portion 48 of the spool 40. As described above, when the valve assembly 10 is in the second gain state 90, a reduced amount of force opposes movement of the spool 40 toward the second body end 24 thereby increasing the force of the fluid acting on the work port 30 relative to the amount of force applied to the spool 40 by the plunger 14 due to the relief passage 78 of the piston 66 being defined when the piston 66 is in the second position. In other words, a reduced amount of force by the plunger 14 on the spool 40 is necessary to move the spool 40 toward the second body end 24 as compared to when the valve assembly 10 is in the first gain state 88.

The force of the fluid acts on the surface areas of the spool face 58 and the socket face 65 of the spool 40. As the force increases, the force approaches the force applied by the plunger 14 and the spool 40 begins to move toward the first body end 22. Movement of the spool 40 toward the first body end 22 increases fluid communication with the tank port 32 and decreases fluid communication with the pressure port 28, thereby causing the force at the work port 30 to stabilize or drop. With force drop, net force of the spool 40 toward the second body end 24 exceeds net force of the spool 40 toward the first body end 22 causing movement of the spool 40 toward the second body end 24. Movement of the spool 40 toward the second body end 24 decreases fluid communication with the tank port 32 and increases fluid communication with the pressure port 28. This cycling of movement causes "modulation" (i.e. back and forth movement) of spool 40. During modulation, the user continues to apply pressure to plunger 14. The spool 40 modulates until the pressure force and the force of the modulating biasing member 92 is balanced against the force of the plunger 14. At steady state equilibrium, (when the kinematic energy forces resulting from a changes in the force applied by the plunger 14 or force from the working unit 20 have subsided) the spool 40 will attain a stabilized position where fluid flow from the pressure port 28 to the work port 30 equals the fluid flow from the work port 30 to the tank port 32.

Upon desired release of the fluid, the user reduces pressure to the plunger 14 and no longer generates a force toward the second body end 24. The spool 40 moves in the toward the first body end 22 to the neutral position by the imbalance of force of the fluid and the force from the first compensating biasing member 80. In the neutral position, fluid is permitted to flow from the work port 30 around the flow portion 52 of the spool 40 and to the tank port 32.

Flow rate from the work port 30 to the tank port 32 is determined by the amount of flow required in the application, for example, the amount of flow necessary to disengage a hydraulic actuator or hydraulic brake within an acceptable amount of time. For a given spool configuration, the open area or gap providing for fluid communication between ports is a function of spool stroke or spool travel. Greater flow rates require greater cross-sectional flow areas or gaps and therein require the spool 40 to travel farther to increase the area of the gap. Similarly, when the plunger 14 is first energized, the required flow rate from the pressure port 28 to the work port 30 is determined by the amount of flow required in the application, for example, the amount of flow necessary to actuate a hydraulic brake within an acceptable amount of time.

As introduced above, a system for controlling the working unit 20 is also provided herein. The system has the first gain state 88 and the second gain state 90. The system includes a fluid source 16 configured to provide the fluid force. The system further includes the valve assembly 10 with the valve assembly 10 in fluid communication with the fluid source 16. The valve assembly 10 includes the plunger 14. The valve assembly further includes the modulating biasing member abutting the plunger 14. The valve assembly 10 further includes the spool 40. The spool 40 operatively coupled to the plunger 14. The plunger 14 is configured to move the spool 40 between the neutral position and the energized position. The valve assembly 10 further includes the piston 66. The piston 66 is in fluid communication with the fluid source 16. The piston 66 is configured to move between the first piston position and the second piston position. The system further includes a working unit 20 in fluid communication with the valve assembly 10 and configured to activate in response to the fluid force. The system is in the first gain state 88 when the piston 66 is in the first piston position and the system is in the second gain state 90 when the piston 66 is in the second piston position.

Although the invention has been described in connection with specific preferred embodiments, it should be understood that the invention as claimed should not be unduly limited to these specific embodiments. While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

INDUSTRIAL APPLICABILITY

While the present invention is not limited to a particular end application, use or industry, vehicles often rely on valve assemblies to provide fluid to working units, such as wheel brakes. The valve assembly is configured to move between a first piston position and a second piston position for providing multiple gain states for the valve assembly.

What is claimed is:

1. A valve assembly, comprising:
a valve body defining a bore;
a plunger adjacent to the valve body;
a modulating biasing member disposed in the bore and abutting the plunger;
a spool disposed in the bore and adjacent the plunger with the modulating biasing member disposed therebetween, the plunger configured to move the spool between a neutral position and an energized position, and the spool defining a socket;
a piston disposed in the socket and configured to move between a first piston position and a second piston position within the socket; and
a dowel extending through the spool and the piston with the spool and piston operatively arranged with the dowel so as to slide relative to the dowel.

2. The valve assembly of claim 1, wherein movement of the spool from the neutral position to the energized position generates a fluid force and wherein the piston is adapted to move to the second piston position in the presence of the fluid force.

3. The valve assembly of claim 1, wherein the plunger is configured to receive a force from a user to move the spool from the neutral position to the energized position, and wherein the force by the user required to move the spool toward the energized position when the piston is in the second piston position is decreased relative to the force required when the piston is in the first piston position.

4. The valve assembly of claim 1, wherein the spool has a spool face, the dowel has a dowel face, and the spool defines a cavity between the spool face and the dowel face.

5. The valve assembly of claim 4, wherein the spool and the dowel cooperate to define a channel extending between the socket and the cavity such that the socket is in fluid communication with the cavity.

6. The valve assembly of claim 5, wherein the channel is adapted to partially restrict a fluid moving from the cavity to the socket.

7. The valve assembly of claim 1, wherein the spool and the piston cooperate to define a relief passage when the piston is in the second piston position.

8. The valve assembly of claim 1 further comprising:
a first compensating biasing member exhibiting a first force on the spool to bias the spool to the neutral position; and
a second compensating biasing member exhibiting a second force on the spool to bias the spool to the neutral position and on the piston to bias the piston to the first piston position;

wherein the piston is configured to move to the second piston position prior to the spool moving to the energized position due to a ratio of the first force and the second force.

9. The valve assembly of claim 8, wherein the piston is adapted to generate a force to oppose the second force of the second compensating biasing member.

10. The valve assembly of claim 9, wherein the force generated by the piston is limited to a pre-defined force acting on the piston when the piston is in the second piston position, and wherein the pre-defined force is in accordance with the second force of the second compensating biasing member when the piston is in the second piston position.

11. The valve assembly of claim 1, wherein the valve assembly has a first gain state and a second gain state, the valve assembly is in the first gain state when the piston is in the first piston position, and the valve assembly is in the second gain state when the piston is in the second piston position.

12. The valve assembly of claim 1, wherein the first piston position and the second piston position of the piston are relative to the spool.

13. A system having a first gain state and a second gain state, the system comprising:
    a fluid source configured to provide a fluid force;
    a valve assembly in fluid communication with the fluid source, the valve assembly comprising:
        a plunger,
        a modulating biasing member abutting the plunger;
        a spool adjacent the plunger with the modulating biasing member disposed therebetween, the plunger configured to move the spool between a neutral position and an energized position;
        a piston in fluid communication with the fluid source via a port, the piston configured to move between a first piston position and a second piston position; and
        a dowel extending through the spool and the piston with the spool and piston operatively arranged with the dowel so as to slide relative to the dowel; and
    a working unit in fluid communication with the valve assembly and configured to activate in response to the fluid force;
    wherein the system is in the first gain state when the piston is in the first piston position and the system is in the second gain state when the piston is in the second piston position.

14. The system of claim 13, wherein movement of the spool from the neutral position to the energized position generates the fluid force and wherein the piston is adapted to move to the second piston position in the presence of the fluid force.

15. The system of claim 13, wherein the spool has a spool face, the dowel has a dowel face, and the spool defines a cavity between the spool face and the dowel face.

16. The system of claim 15, wherein the spool defines a socket in which the piston is disposed, and the spool defines a channel extending between the socket and the cavity such that the socket is in fluid communication with the cavity.

17. The system of claim 13, wherein the valve assembly further comprises:
    a first compensating biasing member exhibiting a first force on the spool to bias the spool to the neutral position; and
    a second compensating biasing member exhibiting a second force on the piston to bias the piston to the first piston position;
    wherein the piston is configured to move to the second piston position prior to the spool moving to the energized position due to a ratio of the first force and the second force.

18. The valve assembly of claim 17, wherein the spool defines a socket in which the piston is disposed, the piston is adapted to limit pressure in the socket.

* * * * *